March 6, 1945.  J. DYSON  2,371,035

PROTECTIVE CIRCUIT FOR RECTIFERS

Filed Aug. 9, 1943

Inventor:
James Dyson,
by Harry E. Dunham
His Attorney.

Patented Mar. 6, 1945

2,371,035

UNITED STATES PATENT OFFICE 2,371,035

PROTECTIVE CIRCUITS FOR RECTIFIERS

James Dyson, Rugby, England, assignor to General Electric Company, a corporation of New York Application August 9, 1943, Serial No. 497,946
In Great Britain October 22, 1942

3 Claims. (Cl. 175—363)

My invention relates to rectifier circuits and in particular to rectifier circuits in which harmful voltages can arise across the rectifier if the unidirectional current circuit thereof is opened. It is an object of my invention to provide an improved protective circuit for such a rectifier circuit.

In U. S. Letters Patent No. 2,153,378, Kramer, granted on April 4, 1939, and assigned to the same assignee as the present invention, there is disclosed a direct current measuring arrangement in which genuine transformer action is obtained and which comprises a saturable inductance carrying direct current windings and alternating current windings, the latter being supplied with alternating current from an alternating current source through a full wave rectifier. The direct current output of the rectifier flows through a measuring instrument whose current capacity, because of the transformer action of the measuring arrangement, need not be of the same order as that of the circuit in which current is to be measured. In such an arrangement it is often convenient to locate the measuring instrument at a distance from the circuit in which current is to be measured and to connect it thereto by suitable current carrying leads or conductors. An object of my invention is to provide an improved means for protecting the rectifier of such a metering arrangement in instances when the leads to the measuring instrument accidentally become disconnected and the full alternating current voltage is impressed across the rectifier.

A further object of my invention is to provide an additional, normally inoperative, path for the output currents of such a rectifier which path becomes operative upon the arising of greater than normal voltages across the rectifier terminals to prevent the rising of these voltages to values greater than that which the rectifier is designed to withstand.

Figure 1:
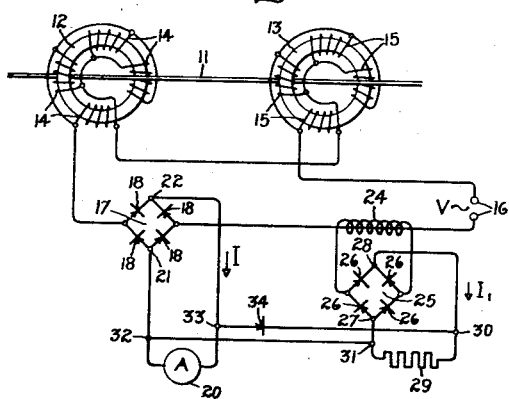
Figure 2:
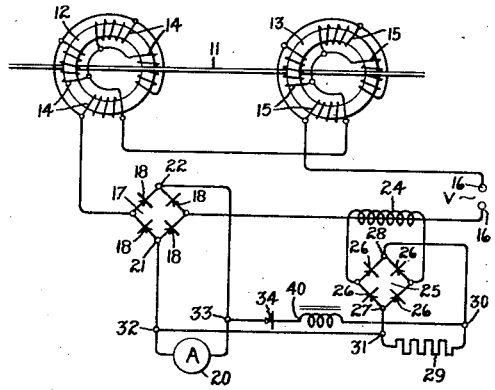
Figure 3:
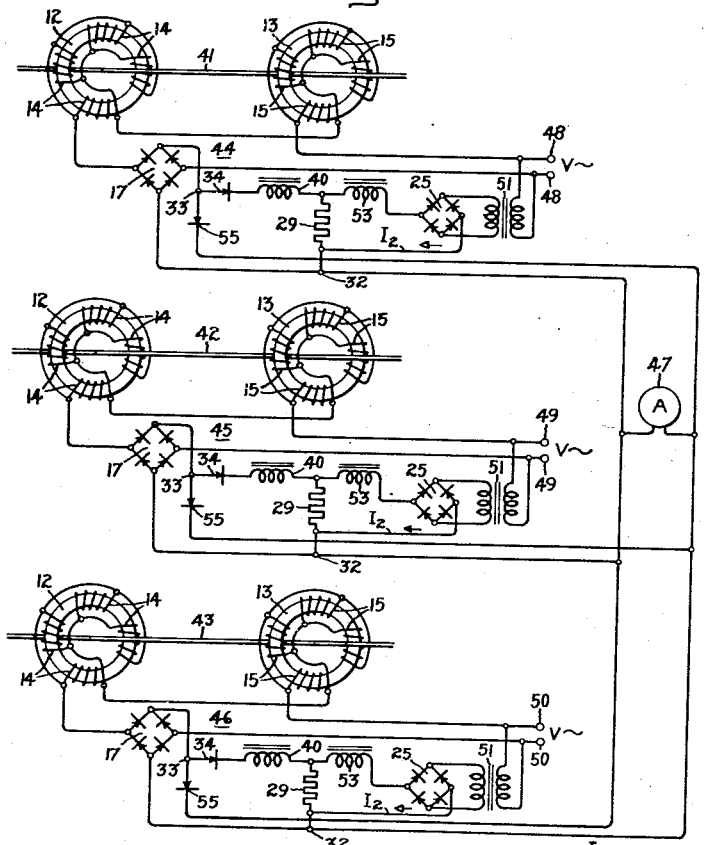

The features of my invention which I believe to be novel are set forth with particularity in the appended claims. My invention itself, however, both as to its organization and method of operation, together with further objects and advantages thereof, may best be understood by reference to the following description taken in connection with the accompanying drawing, in which Fig. 1 is a direct current measuring arrangement embodying my invention; Fig. 2 is a modification of the current measuring arrangement of Fig. 1; and Fig. 3 is a schematic diagram representing another modification of my invention. Throughout the figures of the drawing, like reference characters are utilized to designate like parts.

In the arrangement illustrated in Fig. 1, there is a direct current winding which may be in the form of a single rod or bar 11 carrying a direct current which is to be measured, and, in inductive relation to the direct current winding 11, is a pair of magnetic cores 12 and 13. The cores 12 and 13 are preferably laminated or are strip-wound from magnetic strip material and they are shown as continuous rings surrounding the direct current winding or rod 11. Each of the cores 12 and 13 carries an alternating current winding and, preferably, the windings are divided so that the core 12 carries a plurality of alternating current windings 14 and the core 13 carries a plurality of alternating current windings 15. A source of alternating current 16 is provided to which the alternating current windings of the cores 12 and 13 are connected in opposition through the full wave rectifier 17. The multiple group of windings 14 may be connected in series with the multiple group of windings 15.

The full wave rectifier 17 consists of four rectifier units 18 which are arranged in the well-known bridge, or Graetz, connection and a direct current responsive device 20 is connected across the opposite points 21, 22 of the rectifier. The direct current responsive device may take, for example, the form of a D'Arsonval galvanometer.

A current transformer 24 is connected in series with the alternating current circuit 16 and supplies current to an auxiliary rectifier 25 consisting of four rectifier units 26 connected similar to the units of rectifier 17. Connected across the output terminals 27, 28 of rectifier 25 is a load resistance 29 whose opposite terminals 30, 31 are connected respectively to the opposite terminals 32, 33 of the direct current responsive device 20, terminal 30 being connected to terminal 33 through a half wave rectifier 34.

As is disclosed in the above-mentioned patent to Kramer, the cores 12 and 13 are composed of a material having a substantially rectangular magnetization curve and the design is such that the core material is operated in a substantially horizontal portion of the magnetization curve. One such material is an alloy, sold under the trade name "Mu-Metal," which consists of approximately 74% nickel, 20% iron, 4% copper, 1½% chromium, and lesser amounts of manganese and silicon.

In the operation of the direct current transformer portion of the above described circuit, the winding 11, of course, carries the direct current to be measured. Magnetic cores 12 and 13 and windings 14 and 15 are so designed that the magnetic material operates in the substantially horizontal portion of the magnetization curve. Each of the cores 12 and 13 develops half of the flux wave and together they give rise to a square wave alternating current across the input terminals of rectifier 17. The magnitude of the voltage of the source 16 is without appreciable effect upon the magnitude of the current flowing through the windings 14 and 15 for the reason that the current in these secondary windings is governed only by the amount of compensating flux needed to overcome the effect of the primary or direct current. This square wave alternating current is rectified by the rectifier 17 and flows through the current responsive device 20.

In such a circuit it is evident that the voltage across the rectifier units 18 is only that due to the voltage drop caused by current flowing through the device 20 and the leads connecting this device to the terminals 21, 22. This voltage may be, for example, of the order of 10 volts whereas the full alternating current voltage of the source 16 is of the order of 250 volts. The rectifier 17 accordingly is designed to withstand voltages of the order of 10 volts, although of course it may have a normal voltage rating slightly higher in order to maintain reverse current through the rectifier at a minimum, as well as to withstand high frequency transient voltages which occur in normal operation of the transformer.

It is apparent that should the device 20 be accidentally disconnected from across the terminals 21, 22 the full alternating current voltage is impressed across the rectifier units. In order to prevent this full voltage from appearing across these terminals to puncture or burn out the individual units 18, an alternative path is provided for the unidirectional currents of the rectifier 17 in the case of such an accident. This path comprises the resistance 29 which is connected across the points 32, 33 of the metering circuit. Physically, the point 32 may comprise terminal 21 and the point 33, terminal 22.

If the resistance of the device 20 and the leads connected thereto between the points 32 and 33 is R and the unidirectional current provided by rectifier 17 is I, the voltage across the terminals 32, 33 is IR. Similarly, if the direct current provided by rectifier 25 is $I_1$ and the resistance of resistor 29 is $R_1$, the voltage across the terminals 30, 31 is $I_1R_1$. The net voltage, therefore, around the circuit 30, 31, 32, 33 is $IR-I_1R_1$. If the ratio of the transformer 24 and the magnitude of resistance 29 be chosen so that $I_1R_1$ is greater than IR, the net voltage around the above-mentioned circuit is negative and tends to force current through rectifier 34 in the non-conducting direction. The resultant current which flows through this rectifier is, of course, very small so that the current through the device 20 is substantially equal to I and the operation of the direct current measuring arrangement is the normal operation as described in the above-mentioned Kramer patent.

If, however, the metering device 20 is accidentally disconnected, the voltage across points 32, 33 rises and the current I flows through the rectifier 34 and the load resistance 29. The voltage across rectifier 17 under such conditions is equal to the potential drop through rectifier 34, together with the drop across load resistance 29. This latter potential drop is equal to $R_1(I+I_1)$. Taking a numerical example, if $R=1$ ohm, $R_1=1.5$ ohms, and $I=I_1=5$ amps., the potential drop across resistance 29 is 1.5 (5+5) =15 volts. The potential across rectifier 34 may be 5 volts so that the total voltage across rectifier 17 is then 20 volts. Since the units of rectifier 17 may readily be designed to withstand such a voltage, the meter 20 may be disconnected indefinitely without damage to the rectifier units.

In the protective circuit for the direct current measuring arrangement shown in Fig. 2, improved accuracy of the measurements is obtained by the connection of a small inductance 40 in series with rectifier 34. When inductance 40 is not present in the circuit, the voltage wave across the points 32, 33 differs slightly from that across the points 30, 31 by reason of the inductive reactance of the leads connected to the metering device 20 between the terminals 32, 33. This difference in wave form gives rise to a small current through rectifier 34 at certain points of the cycle. Insertion of inductive reactance or choke 40 is effective to keep this current to a minimum value and to improve the accuracy of measurements.

In the modification of the invention shown in Fig. 3, a plurality of direct current circuits 41, 42, 43 are supplied with individual current measuring arrangements 44, 45, 46, the output currents of which flow through a single totalizing metering device 47. The current measuring arrangements 44–46 may be located at relatively distant points and the circuits may be supplied respectively with alternating voltages from different sources 48, 49, 50. The construction of the current measuring arrangements 44–46 is similar to that of the arrangement shown in Fig. 1, with the exception that the rectifiers 25, instead of being supplied with current from a series type of transformer, are connected across the respective secondary winding of transformers 51 connected across the alternating current sources 48–50. By such an arrangement the protective circuit of each individual metering arrangement is rendered independent of the current flow in the other direct current circuits. Thus, if a current type of transformer is used for the current flow in one of the direct current circuits 41–43, the voltage drop across the corresponding resistance 29 would be lower than the potential drop across the rectifiers 17 of the other measuring circuits and the resistance 29 of the metering arrangement having the low load condition would act as a shunt path across the metering device 47 to give a false indication of total current flow. Use of the transformers 51, however, prevents this condition by providing a constant current $I_2$ from the rectifiers 25 in the circuits 44–46.

The current measuring arangements 44–46 differ from that of Fig. 1 also in that an inductive reactance 53 is connected in series with the resistance 29 in each of the arrangements 44–46 to function as a smoothing choke for the current $I_2$ flowing through the direct current circuits of the rectifiers 25.

The potential drop across the resistance 29 in the arrangements 44–46 is chosen such that it is greater than the voltage which can arise across the rectifiers 17 in the absence of an open circuit in the direct current paths 41–43. In order to provide correct summation of currents flowing in the remaining circuits 44–46 when the alternating current supplied to one of these circuits is switched off while the others are operating, the half wave rectifiers 55 are provided between the terminals 33 and the metering device 47 in each of the metering arrangements. Thus, for example, if the A. C. source 48 is switched off, the rectifier 55 in metering arrangement 44 prevents the flow of the output currents of circuits 45 and 46 through the shunt path across device 47 comprising resistance 29, coil 40, and half wave rectifier 34 in the metering circuit 44.

The operation of the remaining portions of the metering arrangements 44-46 of the circuits of Fig. 3 is the same as that described in connection with the circuit of Figs. 1 and 2. It is apparent, of course, that the presence of transformer 51 connected across the alternating voltage source renders the expression for the maximum voltage across the rectifiers 17 of the circuits more complicated than in the case of the measuring arrangements of Figs. 1 and 2. It is apparent, also, that metering devices may be used for the individual circuits 44-46 to indicate the current flowing through the direct current circuits 41-43.

While I have shown a particular embodiment of my invention, it will of course be understood that I do not wish to be limited thereto since various modifications may be made, and I contemplate by the appended claims to cover any such modifications as fall within the true spirit and scope of my invention.

What I claim as new and desire to secure by Letters Patent of the United States is:

1. In combination, a source of alternating potential, a rectifier having input terminals connected to said source through an impedance and output terminals across which a unidirectional potential is developed, an output circuit connected across said output terminals, said impedance limiting the intensity of the potential across said rectifier when said output circuit is closed, and means to limit the intensity of the potential across said rectifier when said output circuit is opened, said means comprising a resistance and a unilateral conducting device connected in series across said output terminals, and means to cause a unidirectional current to flow through said resistance to develop thereacross a voltage having an intensity greater than said unidirectional potential, said voltage being of such polarity and said unilateral device being so poled that current from said rectifier is prevented from flowing through said resistance when said output circuit is closed.

2. In combination, a source of alternating potential, an inductive load and a rectifier connected in series circuit across said source, said rectifier having a unidirectional output circuit, and means for preventing rise of potential across said rectifier upon the opening of said unidirectional circuit, said means comprising a resistance and a half wave rectifier connected in series across said first rectifier, and means coupled to said source to cause a unidirectional current to flow through said resistance, said current being of such magnitude and said half wave rectifier being so poled that current from said first rectifier is prevented from flowing through said resistance when said unidirectional circuit is closed.

3. In combination, a source of alternating potential, an inductive load and a rectifier connected in series circuit across said source, said rectifier having a unidirectional output circuit, and means for preventing rise of potential across said rectifier upon the opening of said unidirectional circuit, said means comprising a second rectifier coupled to said series circuit, a resistance connected across the unidirectional current output circuit of said second rectifier, and means including a half wave rectifier connecting said resistance across the output circuit of said first rectifier, said second rectifier and said half wave rectifier being so poled that current from said first rectifier does not flow through said resistance when said unidirectional circuit of said first rectifier is closed.

JAMES DYSON.